Sept. 23, 1958   C. E. LEAVITT ET AL   2,853,129
CANOPIES FOR WINDSHIELDS
Filed March 14, 1957   2 Sheets-Sheet 1

Cyril E. Leavitt
Sam Kelton, Jr.
INVENTORS

BY *Clarence A. O'Brien*
*and Harvey B. Jacobson*
Attorneys

Sept. 23, 1958 C. E. LEAVITT ET AL 2,853,129
CANOPIES FOR WINDSHIELDS
Filed March 14, 1957 2 Sheets-Sheet 2
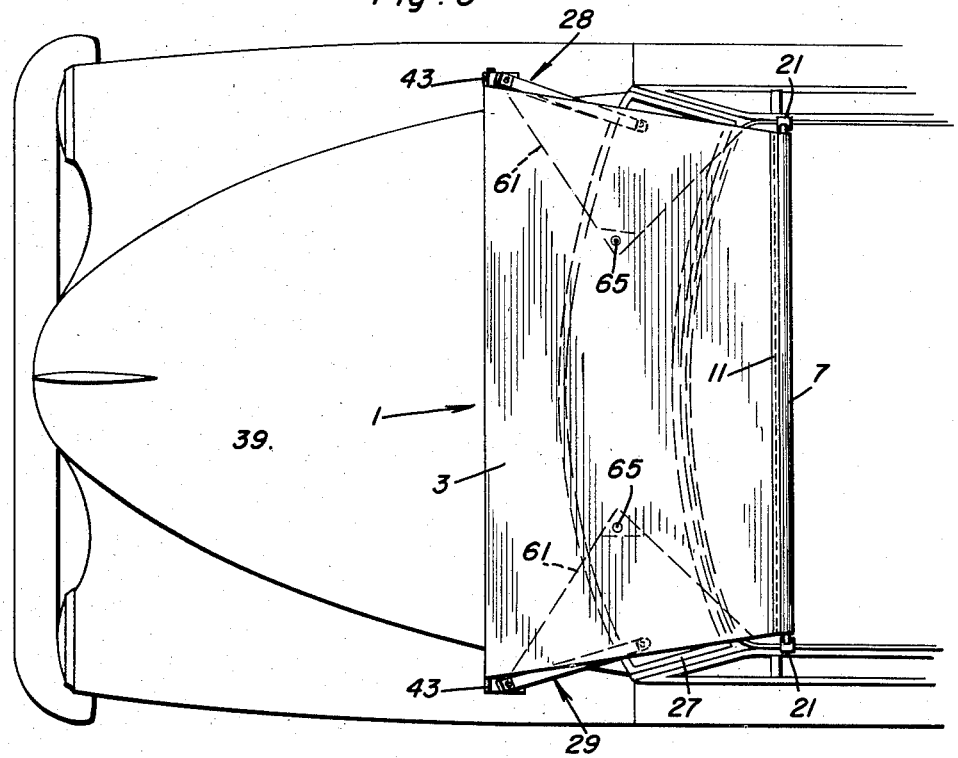
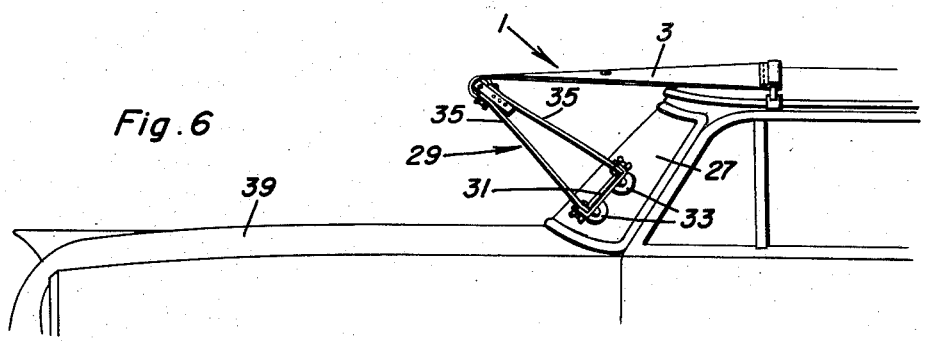
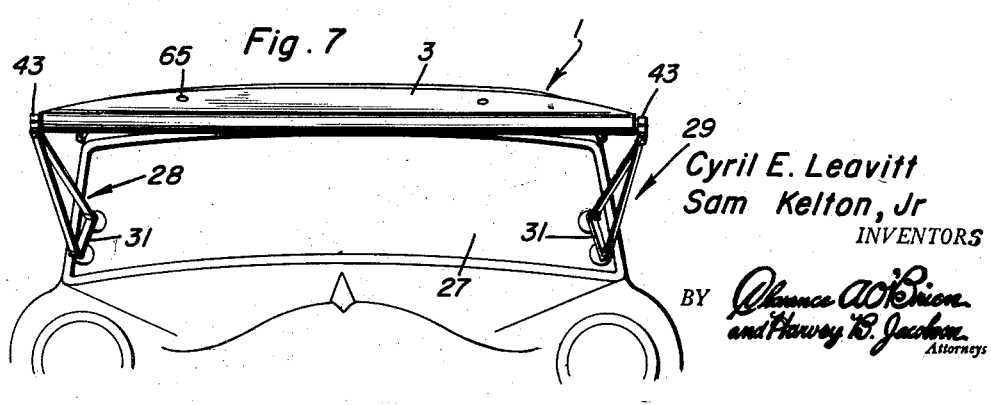
Cyril E. Leavitt
Sam Kelton, Jr
INVENTORS United States Patent Office 2,853,129
Patented Sept. 23, 1958

2,853,129

CANOPIES FOR WINDSHIELDS

Cyril E. Leavitt, Marianna, Fla., and Sam Kelton, Jr., Nashville, Tenn.

Application March 14, 1957, Serial No. 646,159

4 Claims. (Cl. 160—66)

Our invention relates to improvements in canopies for protecting automobile windshields.

The primary object of our invention is to provide an efficient canopy for protecting the windshield of an automobile against the accumulation of rain, snow and dust thereon at drive-in theaters so that occupants of the automobile may see clearly through the windshield.

Another object is to provide a canopy for the above purpose which embodies means for attaching the same to the top gutters of an automobile and to either the fenders or windshield as may be most practical with automobiles of different types.

Still another object is to provide a canopy in accordance with the foregoing which is adapted for arrangement in a compact bundle for carrying or storing in an automobile trunk and which is durable, simple in construction, inexpensive to manufacture and will not mar the automobile.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5 is a fragmentary plan view of the canopy attached to the top gutters and windshield of an automobile;

Figure 6 is a fragmentary view in side elevation of the same; and

Figure 7 is a fragmentary view in front elevation of the same.

Figure 1:
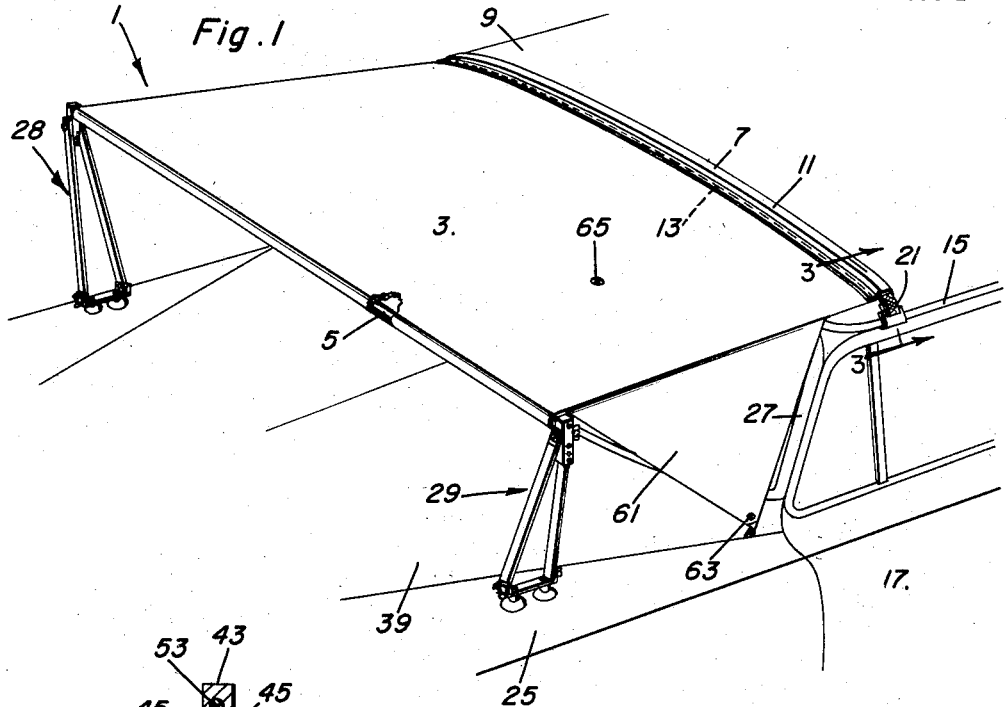
Figure 1 is a fragmentary view in perspective, partly broken away and in section, of our improved canopy attachment to the top gutters and fenders of an automobile.
Figure 2:
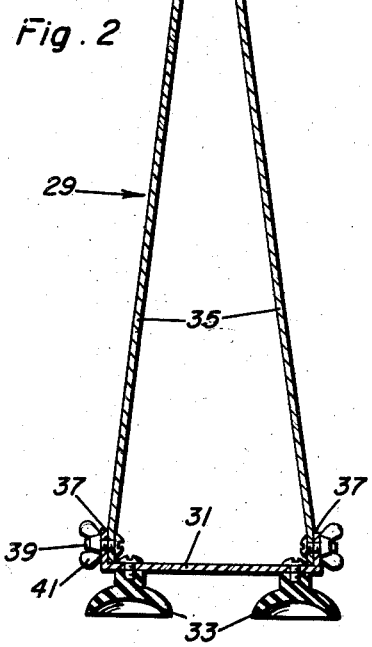
Figure 2 is an enlarged view in vertical section of an attaching bracket forming part of the attaching means.
Figure 3:
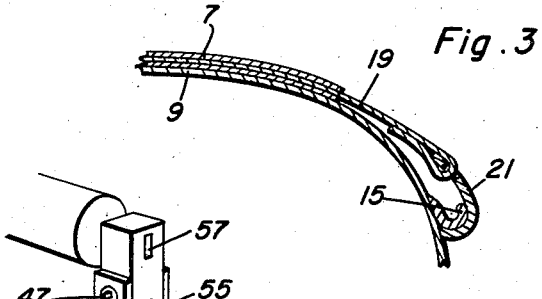
Figure 3 is an enlarged, fragmentary view in section taken on the line 3—3 of Figure 1.
Figure 4:
Figure 4 is an enlarged fragmentary view in perspective of the attaching bracket.

Referring to the drawings by numerals, according to our invention a canopy, designated generally by the numeral 1, is provided comprising a sheet 3 of flexible plastic rectangular in shape, with the exceptions presently noted and which is attached in any suitable manner to a spring actuated roller such as a conventional window shade roller 5 for rolling up thereon and unrolling therefrom and is provided with a free edge 7 for overlying the front end of an automobile top 9. The free edge 7 is provided with a reinforcing hem 11 stitched down as at 13.

The free edge 7 of the sheet 3 is provided with means for attaching the same, in overlying position on the top 9, to the top gutters 15 of the automobile 17 and which comprises a web tape 19 extending through said hem 11 and provided with terminal hooks 21 adapted to hook under said gutters 15 and which are formed of "Nylon" or similar material which will not scratch the gutters 15. Preferably, the tape 19 is elastic to cause the free edge 7 of the sheet 3 to tightly hug said top 9.

Means is provided for attaching the ends of the roller 5 forwardly of the windshield 23 of the automobile 17 to either the fenders 25 as shown in Figure 1 or to the windshield 27 as shown in Figure 5 to 7 so that the sheet 3 extends forwardly over the windshield 27 to cover the same. This means comprises a pair of upstanding right and left supporting brackets 28, 29 which are provided for said ends of the roller 5.

Each bracket 29 comprises a U-shaped base bar 31 having bottom suction cup 33 thereon. A pair of upwardly converging side bars 35 are pivoted at the lower ends thereof to the ends 37 of the base bar 31 by screw bolts 39 having wing nuts 41. A vertically elongated roller attaching bar 43 is pivoted intermediate its ends between the upper ends 45 of the side bars 35 by a transverse screw bolt 47 having a wing nut 49 thereon. The attaching block 43 of the right bracket 28 is provided with vertically spaced, transverse bores 51 for journaling the usual round end stud 53 of the roller 5, whereas the attaching bar 43 of the left bracket 29 is provided with vertically spaced transverse rectangular slots 55 for receiving the usual square stud 57 of such rollers.

As will be seen in Figure 1, the brackets 28, 29 are attachable to the fenders 25 in upright position by the suction cups 33 in position for vertical swinging adjustment of the side bars 35 to position the bars 43 so that the studs 43, 57 are positioned in selected bores 51 and slots 55 for support of the roller 5 by the brackets 28, 29 in selected vertically adjusted position to extend across the hood 59 of the automobile and so that the roller 5 tensions the sheet 3 into taut condition. The side bars 35 are clamped to the base bars 31 in swingably adjusted positions by the wing nuts 41. The supporting bars 43 are swingably adjustable toward and from the ends of the roller 5 on the bolts 47 to align the bores 51 and slots 55 with the studs 53, 57 and clamped in adjusted position between the side bars 35 by the wing nuts 49.

As shown in Figures 5 to 7, the brackets 28, 29 are attachable by the suction cups 33 to the windshield 27 in upwardly and forwardly inclined position to support the roller 5 forwardly of the windshield 27.

Preferably a pair of triangular side edge flaps 61 are provided on the sheet 3 in suitably spaced relation forwardly of the free edge 9 to hang pendant in front of the windshield 27 adjacent its ends as shown in Figure 1 and prevent dust, rain and the like from blowing onto the windshield 27 from the sides of the automobile. The flaps 61 and the sheet 3 are provided with coating snap fasteners so that the flaps 61 when not in use are foldable under and attachable to the sheet 3 as shown in Figure 5.

To detach the canopy 1, the hooks 21 are released from the gutters 15 whereupon the roller 5 will wind up the sheet 3 thereon. The brackets 28, 29 may then be detached by pulling the suction cups 33 loose. The wound up sheet 3 and roller 5 and the brackets 28, 29 can be arranged side by side into a compact bundle for storing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A canopy for covering the windshield of an automobile comprising a roller, a sheet of flexible material attached to said roller for unwinding therefrom and winding thereon and having a free edge hem adapted to overlie the automobile top when the sheet is unwound, an elastic tape slidably extending through said hem and having terminal hooks engageable with gutters of an automobile to attach said free edge hem to said top, and means for supporting the ends of the roller comprising a pair of upright brackets attachable to the automobile to space said roller forwardly of said windshield and having devices thereon for supporting the roller at different heights on the brackets.

2. The combination of claim 1, said brackets comprising bases, and pairs of upright side bars pivoted on said base, said devices comprising upright bars pivoted between the bars of the pairs and having vertically spaced apertures therein for selective engagement with the ends of the roller.

3. The combination of claim 1, and triangular side edge flaps on said sheet depending between said windshield and said brackets to prevent wind and rain from blowing under said sheet.

4. The combination of claim 3, said flaps being foldable under and against said sheet when not in use, said flaps and sheet having snap fasteners thereon for retaining said flaps folded.

References Cited in the file of this patent

UNITED STATES PATENTS

| | | |
|---|---|---|
| 826,915 | Armstrong | July 24, 1906 |
| 1,467,766 | Meadows | Sept. 11, 1923 |
| 2,064,393 | Talbott | Dec. 15, 1936 |
| 2,121,264 | Rubottom | June 21, 1938 |
| 2,561,188 | Ferguson | July 17, 1951 |